United States Patent Office.

THOMAS M. FELL AND AMBROSE G. FELL, OF BROOKLYN, NEW YORK, ASSIGNORS TO THEMSELVES AND WILLIAM BELL, OF NEW YORK, N. Y.

Letters Patent No. 66,140, dated June 25, 1867; antedated April 11, 1867.

IMPROVED MODE OF TREATING LEAD SALTS FOR THE MANUFACTURE OF WHITE LEAD.

The Schedule referred to in these Letters Patent and making part of the same.

TO ALL WHOM IT MAY CONCERN:

Be it known that we, THOMAS M. FELL and AMBROSE G. FELL, both of the city of Brooklyn, in the State of New York, have invented a new and improved Method of Preparing Chloride or Oxychloride of Lead, to be used for the manufacture of white lead, mixing with colors, and for other useful purposes; and do hereby declare the following to be a full, clear, and exact description thereof.

By mixing or grinding together chloride of sodium and oxide of lead there is formed a chloride or oxychloride of lead. The chloride obtained in this manner, however, is very imperfect in its combination, and requires a very long and tedious operation of grinding. To obtain our improved chloride or oxychloride of lead, we take chloride of sodium as free as possible from impurities and add sufficient water to take up the whole quantity. This solution is then heated and drained to separate it from its impurities. We next take the oxide of lead, which we grind and stir in a large vessel or mill with sufficient water to form a thin paste. Heat is then applied to the paste until it is brought up to a high temperature. The chloride of sodium while still in a heated state is gradually added to this paste. The mass occasionally becomes stiff, owing to the quick action and combination, necessitating the addition of water occasionally and a thorough stirring and grinding. It usually takes from two to three hours to mix the mass, when it is let stand to cool off and digest for from five to six hours or more until perfect combination ensues. The contents of the vessel are now a chloride or oxychloride of lead and a clear solution of soda. This chloride or oxychloride is superior in quality to that derived by simply grinding the chloride of sodium and oxide of lead, as has been heretofore practised. This solution is now drawn off and the chloride is well washed by water until every remaining trace of soda (caustic) is removed. Twenty per cent. of chloride of sodium we have found to be a good proportion for ordinary purposes. If a much greater quantity than twenty per cent. is added, the resulting chloride will be found of a dark color when manufactured into a pigment or white lead or used for mixing colors. Such is also the case when a less quantity than that is added. In place of chloride of sodium, chloride of potash, lime, or other chlorides may be substituted, but they are more expensive than the first-named one.

Instead of making it into a solution, the salt, if known to be pure, can be simply added to the mixture of oxide and the whole well stirred or ground, and so forth, as before stated, but we prefer a solution, as most salt contains more or less impurities.

Having thus described our improvement, what we claim as new, and desire to secure by Letters Patent, is—

The treatment of oxide of lead with the chloride of sodium, or its equivalent, substantially as described, for the purpose of producing a superior chloride or oxychloride of lead.

THOMAS M. FELL,
AMBROSE G. FELL.

Witnesses:
ANDREW J. TODD,
THOMAS F. PHELAN.